United States Patent
Haas et al.

[19]

[11] Patent Number: 6,129,009
[45] Date of Patent: Oct. 10, 2000

[54] METHOD AND DEVICES FOR PRODUCTION OF EDIBLE, THIN MOULDED STRUCTURES WHICH ARE AT LEAST PARTIALLY OR COMPLETELY DECOMPOSABLE

[75] Inventors: Franz Haas, Vienna; Johann Haas; Johann Sachsenhofer, both of Klosterneuburg, all of Austria

[73] Assignee: Franz Haas Waffelmaschinen-Industrie Aktiengesellschaft, Vienna, Austria

[21] Appl. No.: 09/214,079

[22] PCT Filed: Jun. 27, 1997

[86] PCT No.: PCT/AT97/00144

§ 371 Date: Dec. 22, 1998

§ 102(e) Date: Dec. 22, 1998

[87] PCT Pub. No.: WO98/00027

PCT Pub. Date: Jan. 8, 1998

[30] Foreign Application Priority Data

Jun. 28, 1996 [AT] Austria ..................... 1152/96

[51] Int. Cl.[7] .............. A21B 5/02; A47J 37/00; A47J 37/01
[52] U.S. Cl. .................. 99/353; 99/372; 99/373; 99/374; 99/380; 99/427; 425/348 S; 425/451.5; 425/451.9; 425/595
[58] Field of Search .............. 99/340, 352–355, 99/372–380, 427, 332; 100/234; 249/166, 168; 425/348 S, 256, 259, 351, 260, 422, 595, 438, 468, 451.9, 451.5, DIG. 221; 426/389–391, 280, 94, 52.3, 138, 139

[56] References Cited

U.S. PATENT DOCUMENTS

| | | | |
|---|---|---|---|
| 1,576,202 | 3/1926 | McLaren | 426/389 |
| 3,859,030 | 1/1975 | Griner et al. | 425/348 S |
| 3,901,982 | 8/1975 | Griner et al. | 426/391 |
| 3,958,912 | 5/1976 | Griner et al. | 425/348 S |
| 4,038,007 | 7/1977 | Griner et al. | 425/348 S |
| 4,038,016 | 7/1977 | Griner et al. | 425/451.9 |
| 4,328,741 | 5/1982 | Yoshikazu | 99/355 X |
| 4,667,588 | 5/1987 | Hayashi | 99/372 |
| 5,103,717 | 4/1992 | Haas, Sr. et al. | 99/353 |
| 5,163,313 | 11/1992 | Haas, Jr. et al. | 99/353 |
| 5,223,286 | 6/1993 | Selbak | 426/512 X |
| 5,693,355 | 12/1997 | Haas | 426/523 |
| 5,955,129 | 9/1999 | Haas, Sr. et al. | 99/353 X |

FOREIGN PATENT DOCUMENTS

| | | |
|---|---|---|
| 0 752 209 | 1/1997 | European Pat. Off. . |
| WO 88 00797 | 2/1988 | WIPO . |
| WO 92 10938 | 7/1992 | WIPO . |
| WO 95 00023 | 1/1995 | WIPO . |

*Primary Examiner*—Timothy Simone
*Attorney, Agent, or Firm*—Herbert Dubno

[57] ABSTRACT

A baking apparatus for the production of foamed carbohydrate-based baked products which expand during the baking process has a baking tongs with a pair of tong parts hinged together and a baking mold whose mold halves are each received in a respective one of the tong parts. The hinge has hinge sections connected by two pivot pins with pivot axes offset from one another and enabling a change in the volume of the baking mold. Opposite the hinge sections, a holding device can hold the baking tongs closed.

4 Claims, 2 Drawing Sheets

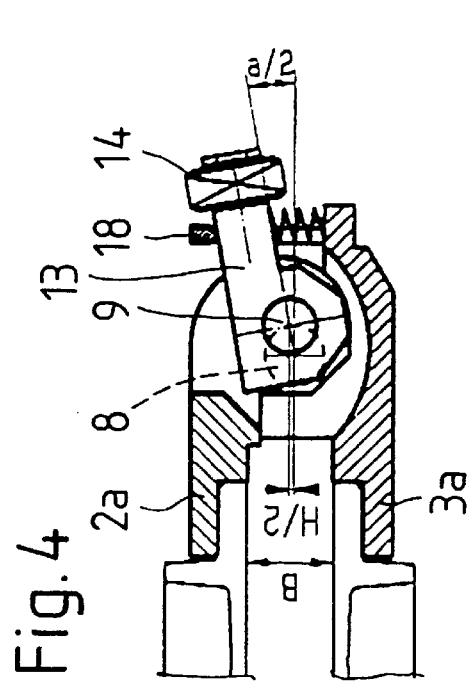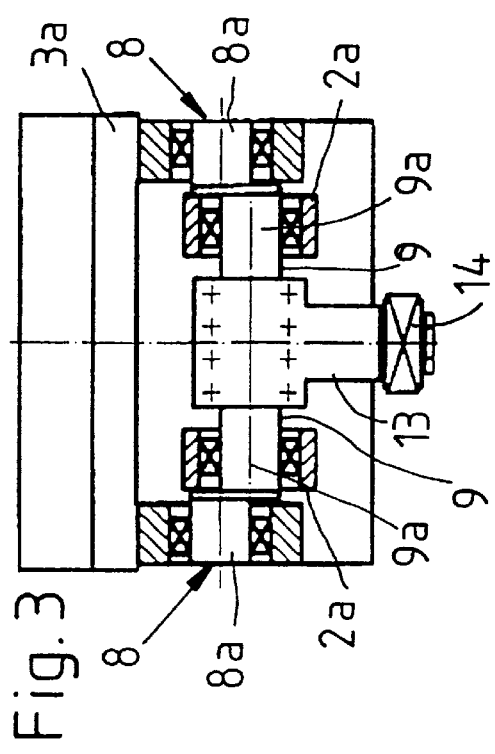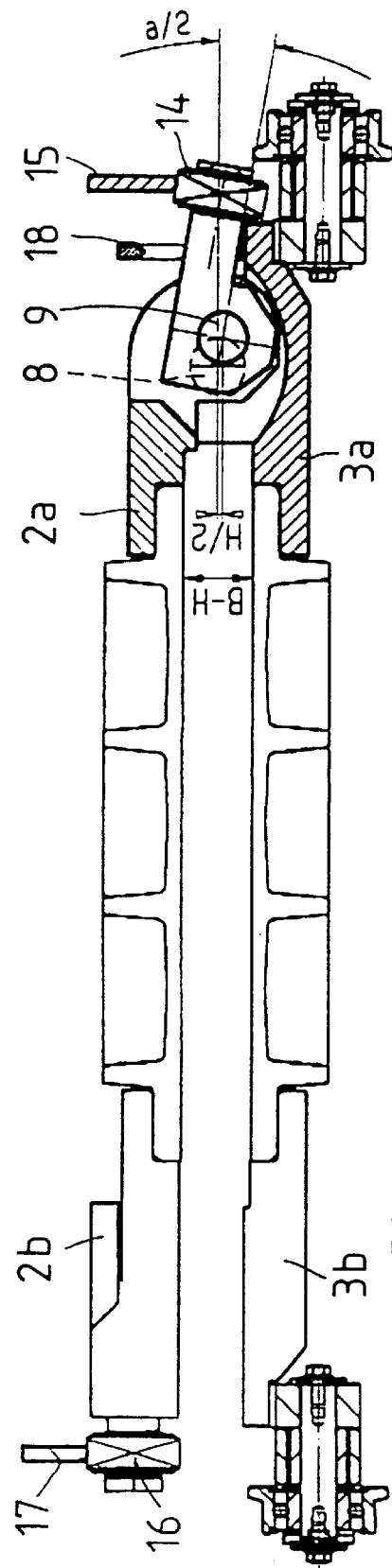

METHOD AND DEVICES FOR PRODUCTION OF EDIBLE, THIN MOULDED STRUCTURES WHICH ARE AT LEAST PARTIALLY OR COMPLETELY DECOMPOSABLE

CROSS REFERENCE TO RELATED APPLICATIONS

This application is a national stage of PCT/AT97/00144 filed Jun. 27, 1997 and based in turn on Australian national application A 1152/96 of Jun. 28, 1996 under the International Convention.

FIELD OF THE INVENTION

The present invention relates generally to the production of edible, at least partially decomposable or completely decomposable thin molded structures, such as cups, plates, fast-food packaging, trays, flat sheets and the like.

The present invention relates primarily to a method for the production of such molded structures, whereby a carbohydrate-based baking material based on carbohydrates applied to the lower part of a multiple-section mold, preferably a two-section mold, the baking material is baked in the mold and the resulting product is conditioned if required.

The present invention further relates to device for producing foamed, thin-walled molded structures, such as cups, plates, fast-food packaging, trays, flat sheets and the like from baking material carbohydrate-based which expand during the baking process.

Besides starches and modified starches and flours, cellulose products can also be considered as carbohydrates.

STATE OF THE ART

The known methods for the production of the mentioned molded structures are based on the baking of the baking materials in heated baking molds, which through the configuration of their baking surfaces in contact with the baking material determine the shape of the finished product and with the mutual distance between the baking surfaces determine the wall thickness of the finished product.

In principle these are the steps of this process:

1. Heating the baking material during the introduction of a precisely dosed amount of baking material into the open mold and during the closing of the mold, whereby a mechanical dough distribution is performed by the upper section of the baking mold.

2. Start of the steam development due to the evaporation of the water contained in the baking material as soon as the boiling point is reached at the contact surfaces between the baking material and the hot baking surfaces of the baking mold.

3. Filling out the baking mold (or the inner baking space of the baking mold defined by the baking surfaces of the baking mold) with baking material, due to the steam impact resulting from the steam development. After approximately 5 to 20 seconds, mostly approximately 10 to 15 seconds, a pressure maximum is reached in the baking mold, after which the interior pressure in the baking mold drops quickly within a further 10 to 45 seconds, under optimal baking conditions of the baking material, within 10 to 35 seconds.

4. Parallel thereto the starch components of the baking material are extensively transformed into paste. The steam development causes the formation of the porous structure inside the baking material, especially since the material is still soft and of undefined shape. In the finished product 5 layers can be differentiated, when examining cross sections under the microscope or in an electronic microscope, to which the following types of structure zones can be assigned:

(a) An outer crust of a thickness of approximately 25 to 50 microns, at the contact surfaces between the molded structure and the hot baking surfaces of the baking mold located inside and outside (respectively on the upper side and the underside) of the molded body and composed of very small pores.

(b) An intermediate layer of approximately 300–600 microns in thickness on both areas inwardly adjacent to the outer crust of the molded structure and composed of medium-sized flat pores.

(c) A core layer of the molded structure with large, mostly spherical pores with low density and with good thermal insulation.

5. After the removal of the main amount of water from the baking material, the temperature in the molded structure goes up, starting with the outer crust, increasing to the temperature of the respective baking surface. However the fixation of the structure inside the baking material (transition from the soft state of the baking material to the hard, glass-like state) takes place only when the water has evaporated extensively. This happens first in the outer crust of the molded structure, and only towards the end of the baking time does it occur in the center of the molded structure.

6. Only when the center is also sufficiently heated and the residual water has been removed to the point that a glazing point of the baking material was surpassed, can the baking mold be opened, without the risk of steam residual inflating the molded body and modifying its laminated structure.

From this description results that the intake of sufficient heat energy in the central area of the molded structure, in order to promote here the baking process and the elimination of water—this is delayed by the insulating effect of the intermediate layers—is the decisive factor determining the total baking time.

The patent literature mentions a short-term whipping process after the introduction of a dosed amount of baking material into the opened baking mold, for the quick, even distribution of the baking material within the mold and for a certain initial steam elimination from the baking material.

The U.S. Pat. No. 5,336,511 describes a process for producing pita pockets with a mold core and a therefrom separated baking core in order to achieve the specific structure of this baked item. Here the position of the core inserts is temporarily not fixed during molding and baking, whereby a "floating" of the core inserts in the baking material becomes possible, combined with an increase of the distance between the baking surfaces during baking. This probably lengthens the baking time.

The application WO 97/00023 relates to the manufacture of compressed pockets through a short-term strong compression of the dough in the initial baking phase. Before and especially after this compression impact, a comparatively bigger distance (2 to 3 times the final wall thickness) of the mold parts is observed, obviously in order to facilitate steam elimination in spite of the compression, and this position of the mold parts is maintained for the most of the baking time (lt. indication 100–110 sec.) is . Only in the end phase (indication 60 sec) the dough compressed again and the baking finished. Here too, as results from the wide distance between the baking surfaces in the intermediate phase and the indications for the baking time—more than 160–170 sec), normal to longer baking times are required.

The mentioned molded bodies are usually produced in baking ovens extending over a long stretch, wherein baking tongs equipped with a baking mold are interconnected to form an endless chain and which within the respective baking oven travel a closed motion path. During one revolution of the baking tong chain in the baking oven, each baking tong passes a pouring station, where the baking material is introduced into an opened baking mold of the opened baking tong. After the pouring station, the baking mold and the baking tong are closed and locked, and the baking tong is transported through a baking space, wherein the baking tong is heated from the outside, while inside the baking mold the baking process takes its course. Subsequently the baking tong reaches a discharge station, where the baking tong is unlocked and the baked molded body is discharged from the opened mold of the baking tong and is removed from the baking oven. The conditioning of the baked molded bodies, if necessary, takes place outside the baking oven.

In the known baking oven, baking tongs are used for the production of foamed, thin-walled molded bodies, whereby respectively one or more baking molds are received in the baking tongs, whose inner baking space, defined by the baking surfaces of the respective baking mold, can no longer be changed after the locking of the baking mold and the baking tongs. In a known baking tong, the baking mold consists of two mold halves each received in its own tong part between a lateral hinge segment and a lateral end segment, which are separated by a main mold separation plane and are provided with baking surfaces on the interfacing frontal sides. When the baking tong is closed, the baking surfaces of the two mold halves face each other at a distance and define at least one inner baking space wherein the respective molded body is foamed and baked. The two tong parts are swingably connected at their hinge segments by a hinge with a pivot axis parallel to the main mold separation plane, and when the baking tong is closed, can be connected at their lateral end segments, which are then opposite to each other, by at least one holding device which, when the baking tong is closed, can be actuated for keeping the baking tong closed. When the baking tong is closed, the lateral end segments of the two tong parts lie against each other over spacer bolts and bear the parts of the holding device which can be engaged and disengaged.

OBJECT OF THE INVENTION

It is the object of the invention to improve the production of edible, thin-walled molded structure, which are preponderantly or completely decomposable.

SUMMARY OF THE INVENTION

In order to solve this problem a method is proposed whereby a carbohydrate-based baking mass is applied to the lower part of the baking mold, the baking mold is closed and the baking mass is baked in the baking mold into a molded structure, which is removed from the baking mold. The resulting molded structure can be subsequently conditioned to a predetermined humidity content within the range of 1–4% by weight, or within the range of 8 and more % by weight. According to the invention, this method is characterized by the fact that, after a preliminary baking time with closed baking mold and with a wall thickness which is greater than the final wall thickness, the prebaked product, after reaching the maximal steam pressure, however at the latest before the hardening of the central layer of the molded body, is compressed to its final wall thickness and completely baked.

It has been found surprisingly, proven to the person skilled in the that thereby it is possible to achieve a significantly shortened baking period in the production of molded structures baked according to the wafer baking technique. The compression process of the invention, which is applied to the prebaked product after the preliminary baking time during which the baking mass is prebaked in the closed baking mold with a wall thickness which is greater than the final wall thickness and after maximal steam pressure has been reached, is addressed mainly to the central layer of the molded body, which at this time is not yet completely hardened. In the compression process of the invention, the prebaked product is compressed before the complete hardening of the central layer to the final wall thickness of the molded body and completely baked.

The shortening of the baking time ranges between 5% and more than 50% compared to the heretofore required time.

The preliminary baking time preferably ranges between approximately 90% and 10% of the total baking time. Advantageously the wall thickness of the molded body during the preliminary baking process does not exceed 4 times the final wall thickness and is preferably approximately 2.7 to 2 times the final wall thickness of the molded body.

The compression can take place in one step, or in stages or can be continuously increasing.

Further it has been proven to be advantageous when, after completed compression, at least a short-term relief of the compression, returning to the maximal wall thickness during preliminary baking, preferably to approximately double the final wall thickness, is performed for the purpose of local pressure release in the molded body.

Without being able to indicate the actual causes of the effect shortening the baking time, it can be assumed:

1. that due to a compression of the not very dense, still soft central layer, and the thermal insulation effect is reduced, 2. that by reducing the distance of the baking surfaces from each other, the heat transfer is favored.

The known initial fluctuations before reaching the steam pressure peak is not affected by that, and because of the relatively short duration, are presumably of little relevance for a possible lengthening or shortening of the baking time.

It is also to be noted that possible engravings in the baking surfaces which cause the outward projection of the molded body, such as ribs, grates and the like are not included in the respective wall thickness. This wall thickness indications refer only to the so-called core thickness of the molded bodies produced according to the wafer baking technique.

The object is achieved with a baking tongs for the production of foamed, thin-walled molded structures, which receives a baking mold consisting of two mold halves, each being received in its own tong part between a lateral hinge segment and a lateral end area. These form halves are separated by a main mold separation plane and provided with baking surfaces at their frontal sides facing each other, which when the baking tong is closed face each other at a distance and define between them an inner baking space, wherein the baking mass is foamed and baked. The two tong parts are swingably connected by means of a hinge and when the baking tong is closed, can be connected to each other at their then opposite lateral end segments by at least one holding device, which when the baking tong is closed is actuated for locking the baking mold. The lateral end segments of the two tong parts carry the engageable and disengageable components of the holding device.

According to the invention, this baking tong is for altering the volume of the inner baking space of their baking mold, the two tong parts can be moved towards each other and away from each other, while the tong and the holding device are closed, whereby for the two hinge sections of the tong parts two different pivot pins, parallel to each other and to the main mold separation plane are provided, which are mutually adjustable for altering the volume of the inner baking space of the baking mold.

This construction makes it possible to compress the baking masses enclosed in the locked baking mold during the baking process.

According to the invention, the two pivot pins of the hinge can be formed by a cranked hinge bolt, whose right-angle bends connect respectively one of the pin sections rotatably supported in the hinge section of one tong part with the pin section eccentrically arranged with respect to the first, rotatably supported in the hinge section of the other tong part.

According to the invention the hinge can be provided with two cranked hinge bolts, each having two journal bearings, each rotatably supported in the hinge sections.

According to the invention, a pivot lever arranged transversely to the two pivot pins of the hinge can be provided, which is nonrotatably connected with one of the two pivot pins, and when the baking tong and the holding device are closed, is transversely swingable with respect to the two pivot pins in order to move the two tong parts in relation to each other.

BRIEF DESCRIPTION OF THE DRAWING

The above and other objects, features, and advantages will become more readily apparent from the following description, reference being made to the accompanying drawing in which:

FIG. 2 is a cross section of closed baking tong with lowered upper tongs part without a baking mold in cross;

FIG. 3 is a horizontal cross section of the baking tong hinge;

FIG. 4 is a vertical cross section of the baking tong hinge of the baking tong, with lifted upper tong part.

SPECIFIC DESCRIPTION

Figure 1:
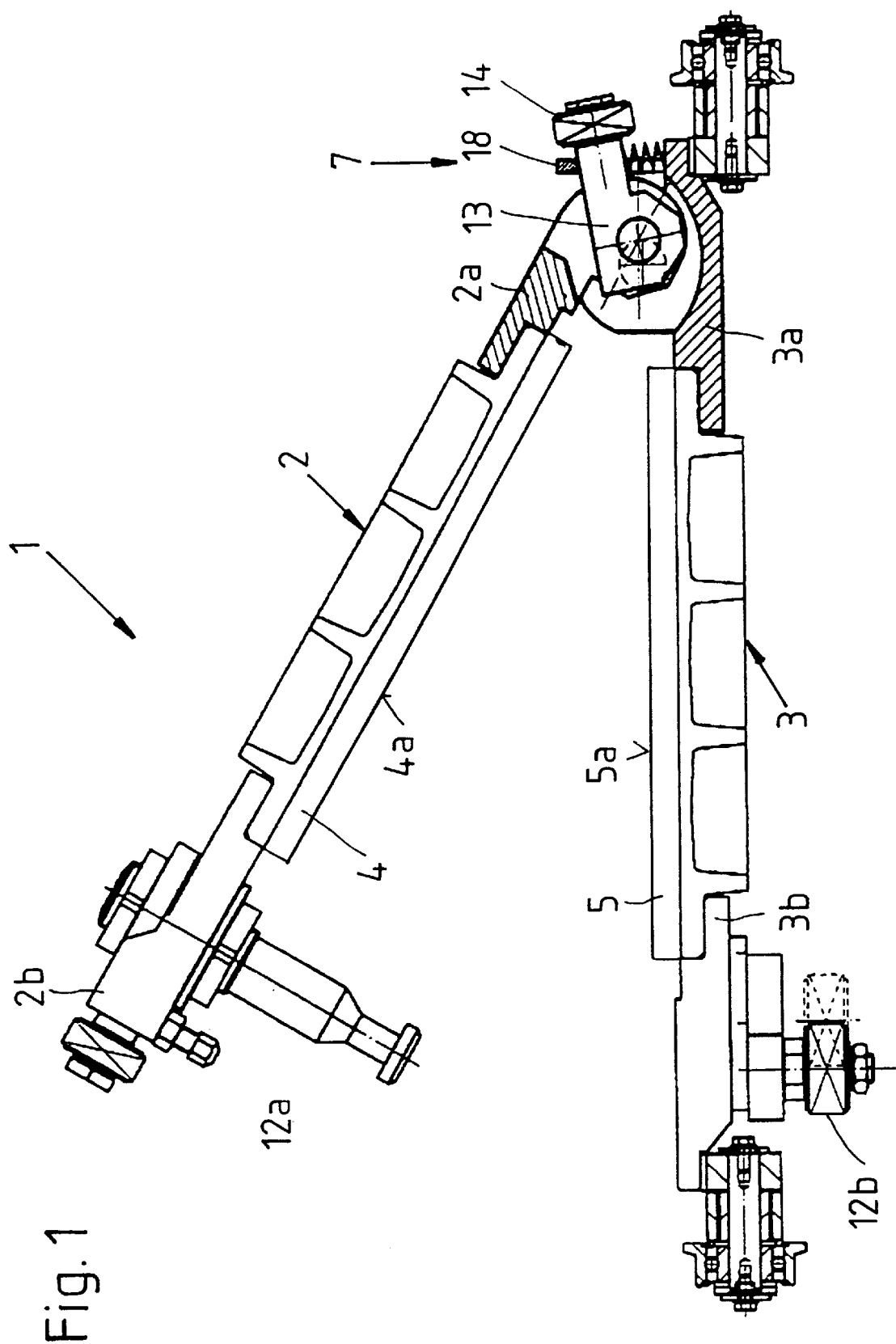
FIG. 1 is a front elevational view partly broken away of opened baking tongs.

The drawing shows a baking tong 1 for producing foamed, thin-walled molded bodies from baking masses which expand during the baking process, with a baking mold received in the baking tong 1 consisting of two mold halves 4, 5, each received in its own tong part 2, 3, between a lateral hinge section 2a, 3a and a lateral end segment 2b, 3b. The mold halves are separated by a main mold separation plane and are provided at their mutually facing frontal sides with baking surfaces 4a, 5a of the two mold halves 4, 5, located at a distance opposite to each other and defining between them at least one inner baking space, wherein the respective molded body is foamed and baked.

The two tong parts 2, 3 are swingably connected to each other at their hinge sections 2a, 3a by a hinge 7, which for the two hinge sections 2a, 3a has two different pivot pins 8, 9 which are parallel to each other and to the main mold separation plane. When the baking tong 1 is closed, the two pivot pins 8, 9 lie in a horizontal plane one behind behind. The pivot pin 8 in front in FIG. 4 is assigned to the lower tong part 3 and the pivot pin 9 in the rear in FIG. 4 is assigned to the upper tong part 2.

The inner baking space is bordered at its outer lateral margins by upper and lower, lateral border strips, not shown in the drawing. The upper border strips, which run transversely to the pivot pins 8, 9 of the hinge 7, are fastened to the outer margins of the upper mold half 4 and project downwards over its baking surface 4a. The lower border strips are fastened to the outer margins of the lower mold half 5 running parallelly to the pivot pins 8, 9 of the hinge 7 and project upwards over its baking surface 5a. When the baking tong is closed, the upper border strips project downwards beyond the then mutually facing baking surfaces of the two mold halves 4, 5 and the lower border strips project upwards beyond the then mutually facing baking surfaces of the two mold halves 4, 5.

The lateral end segments 2b, 3b of the two tong parts 2, 3, which when the baking tong 1 is closed are opposite each other, carry the mutually engageable and disengageable device parts 12a, 12b of a holding device actuatable from the outside for maintaining the baking tong 1 in locked position. When the baking tongs is closed, the device parts 12a, 12b of the holding device can be brought into mutual engagement. The holding device connects then the two tong parts 2, 3 at the lateral end segments 2b, 3b, on the side of the baking tong 1 opposite to the hinge 7.

The two pivot pins 8, 9 of the hinge 7 are formed by a cranked hinge bolt, whose bends connect respectively the pin segment 9a rotatably supported in the hinge section 2a of the one tong part 2 with the thereto eccentrically arranged pin segment 8a rotatably supported in the hinge section 3a of the other tong part 3.

The hinge 7 is provided with two cranked hinge bolts, which are in a mirror-image-like arrangement with respect to each other and respectively have a journal bearing 8a arranged in the hinge section 3a of the lower tong part 3 and a thereto eccentrically arranged journal bearing 9a in the hinge section 2a of the upper tong part 2.

The hinge 7 is provided with a pivot lever 13 arranged transversely to the two pivot pins 8, 9, which is nonrotatably connected with the pivot pin 9 in the rear in FIG. 4, and at its free end bears a guide roller 14, which is provided for the engagement with the guide bars 15 arranged in the baking oven.

At the free end of the upper tong part 2 there is also a guide roller 16, provided for the engagement with the guide bars 17 arranged in the baking oven.

When the baking tong 1 and the holding device are closed, the upper tong part 2 is moved downward, via the guide rollers 14 and 16 engaging in the guide bars 15 and 17 of the baking oven towards the lower tong part 3, substantially vertically with respect to the main mold separation plane, in order to reduce the inner baking space of the baking mold, thereby compressing the baking mass in the inner baking space. Thereby on the hinge side of the baking tong the cranked hinge bolt is pivoted by means of the guide roller 14 and the pivot lever 13, whereby the pivot lever 13 is swung downwards in the position indicated in FIG. 2 and at the same time the rear pivot pin 9 is moved downwards with respect to the main mold separation plane.

In order to relieve the baking masses enclosed in the inner baking space, while the baking tong 1 and the holding device are closed, the upper tong part 2 is moved upwards in relation to the lower tong part 3, substantially vertically with respect to the main separation plane of the baking mold, via the guide rollers 14 and 16 which are engaged with other guide bars of the baking oven. Thereby on the hinge side of the baking tong, the cranked hinge bolt is pivoted upwards via the pivot lever 13, until the pivot lever 13 comes to rest against a stop 18 of the lower hinge section 3a. Thereby the rear pivot pin 9 is moved upwards in relation to the main separation plane of the baking mold.

What is claimed is:

1. A baking apparatus for the production of foamed, thin-walled molded structures made of carbohydrate-based baking masses which expand during the baking process, said baking apparatus comprising:

a baking tongs having a pair of tong parts hinged together;

a baking mold received in the baking tongs and comprising two mold halves each received in a respective one of said tong parts between a lateral hinge section and a lateral end segment, said mold halves being provided at mutually facing sides with baking surfaces, which when the baking tongs is closed are located opposite to each other at a distance and define at least one inner baking space, wherein the baking masses are foamed and baked;

a hinge swingably connecting the two tong parts at said hinge sections; and at least one holding device at said end segments for keeping the baking tongs closed and actuatable when the baking tongs is closed, the lateral end segments carrying engageable and disengageable device parts of the holding device, the two tong parts being movable toward each other and away from each other for altering a volume of the inner baking space of the mold when the tongs and the holding device are closed, whereby for the two hinge sections two different pivot pins parallel to each other and to the main mold separation plane are provided, which are mutually adjustable for altering the volume of the inner baking space of the baking mold.

2. The apparatus according to claim 1 wherein the two pivot pins are formed by a cranked hinge bolt, whose bends connect respectively a pin segment rotatably supported in the hinge section of the tong part with a thereto eccentrically arranged pin segment rotatably supported in the hinge section of the other tong part.

3. The apparatus according to claim 1 wherein the hinge is provided with two cranked hinge bolts, having two journal bearings eccentrically arranged with respect to each other, rotatably supported in one of the respective hinge sections.

4. The apparatus according to claim 1 wherein a pivot lever is arranged transversely to the two pivot pins of the hinge which is nonrotatably connected with one of the two pivot pins and which, when the baking tongs and the holding device are closed, can be pivoted transversely to the pivot pins in order to move the two tong parts in relation to each other.

* * * * *